United States Patent
Lang et al.

(10) Patent No.: US 8,503,313 B1
(45) Date of Patent: *Aug. 6, 2013

(54) METHOD AND APPARATUS FOR DETECTING A NETWORK IMPAIRMENT USING CALL DETAIL RECORDS

(75) Inventors: Howard Lang, Wayside, NJ (US); Jeff Boni, Fuquay Varina, NC (US); Byron Johnson, Durham, NC (US); Herman Lee, Morganville, NJ (US); John Lee, Bartlett, IL (US); John H. Mayr, Raleigh, NC (US); Mark P. Nordberg, Apex, NC (US); Ker-Ren Tu, Manalapan, NJ (US); Christopher Vestal, Durham, NC (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 704 days.

This patent is subject to a terminal disclaimer.

(21) Appl. No.: 11/618,887

(22) Filed: Dec. 31, 2006

(51) Int. Cl.
    *H04J 1/16* (2006.01)
(52) U.S. Cl.
    USPC ............ 370/252; 379/133; 379/137; 379/139
(58) Field of Classification Search
    USPC .................. 370/252, 253, 241, 242; 714/4, 714/253, 37, 39, 42, 43; 709/223, 224; 725/105, 106, 107, 108, 109, 111, 118
    See application file for complete search history.

(56) References Cited

U.S. PATENT DOCUMENTS

| | | | |
|---|---|---|---|
| 6,359,976 B1 * | 3/2002 | Kalyanpur et al. | 379/134 |
| 6,411,679 B1 | 6/2002 | Khasnabish | |
| 6,574,216 B1 | 6/2003 | Farris et al. | |
| 6,795,395 B1 | 9/2004 | Khasnabish | |
| 6,801,607 B1 * | 10/2004 | Marchand et al. | 379/114.14 |
| 6,954,520 B1 * | 10/2005 | Lang et al. | 379/137 |
| 7,463,634 B1 * | 12/2008 | Hansen | 370/395.2 |
| 7,492,886 B1 | 2/2009 | Kalmanek et al. | |
| 2002/0010736 A1 | 1/2002 | Marques et al. | |
| 2002/0073355 A1 * | 6/2002 | Cerami et al. | 714/4 |
| 2002/0078017 A1 * | 6/2002 | Cerami et al. | 707/1 |
| 2003/0046231 A1 * | 3/2003 | Wu | 705/43 |
| 2003/0149919 A1 * | 8/2003 | Greenwald et al. | 714/43 |
| 2005/0183129 A1 * | 8/2005 | Cerami et al. | 725/105 |
| 2006/0002534 A1 | 1/2006 | Lang et al. | |
| 2007/0064616 A1 | 3/2007 | Miranda et al. | |
| 2007/0286158 A1 * | 12/2007 | Cook | 370/352 |
| 2008/0101247 A1 | 5/2008 | Bouchard | |

OTHER PUBLICATIONS

U.S. Appl. No. 11/618,888, filed Dec. 31, 2006.

* cited by examiner

Primary Examiner — Dady Chery

(57) ABSTRACT

A method and system for monitoring a packet network by using call detail records (CDRs) are disclosed. The method first receives at least one call detail record (CDR) at a completion of a call from at least one voice gateway router that serviced said call and analyzes said at least one CDR. The method then monitors at least one performance parameter in accordance with said at least one CDR.

17 Claims, 5 Drawing Sheets

METHOD AND APPARATUS FOR DETECTING A NETWORK IMPAIRMENT USING CALL DETAIL RECORDS

The present application is related to US patent application entitled "METHOD AND APPARATUS FOR MONITORING A PACKET NETWORK", having Ser. No. 11/618,888, which is herein incorporated by reference and is simultaneously filed on the same date with the present application. The present invention relates generally to monitoring of communication networks and, more particularly, to a method and apparatus for detecting a network impairment using call detail records for packet networks such as Voice over Internet Protocol (VoIP) and Service over Internet Protocol (SoIP) networks.

BACKGROUND OF THE INVENTION

Internet services are becoming ubiquitous and customers are receiving voice and data services on Internet based infrastructures such as a Voice over Internet Protocol (VoIP) or Service over Internet Protocol (SoIP) network. The VoIP or SoIP network may experience impairments that will affect one or more customers. When an impairment is detected and/or reported, the network service provider troubleshoots the impairment and performs the necessary remedies. Generally, the problem detection, the troubleshooting, reporting, and analysis are performed by work center personnel. For example, a work center personnel may poll each device involved in handling a call for a customer, e.g., the endpoint devices, border routers, etc., and gather call detail records. The records can be analyzed to determine the cause of the impairment. In a large network, detecting and resolving network impairments often require a very significant amount of resources (e.g., in terms of cost and time). Furthermore, a customer may have a degraded service or no service at all while the network service provider is performing tasks for a lengthy process of gathering information and analysis. The lengthy process could quickly lead to customer dissatisfaction.

Therefore, there is a need for a method that enables the network service provider to detect an impairment in a packet network.

SUMMARY OF THE INVENTION

In one embodiment, the present invention discloses a method and system for monitoring a VoIP/SoIP service on a packet network. The method first receives at least one call detail record (CDR) at a completion of a call from at least one voice gateway router that serviced said call and analyzes said CDR. The method then monitors at least one performance parameter in accordance with said at least one CDR.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for monitoring of packet networks such as VoIP and SoIP networks, e.g., in near-real-time. Although the present invention is discussed below in the context of VoIP networks, the present invention is not so limited. Namely, the present invention can be applied for other networks, e.g., a cellular network and the like.

Figure 1:
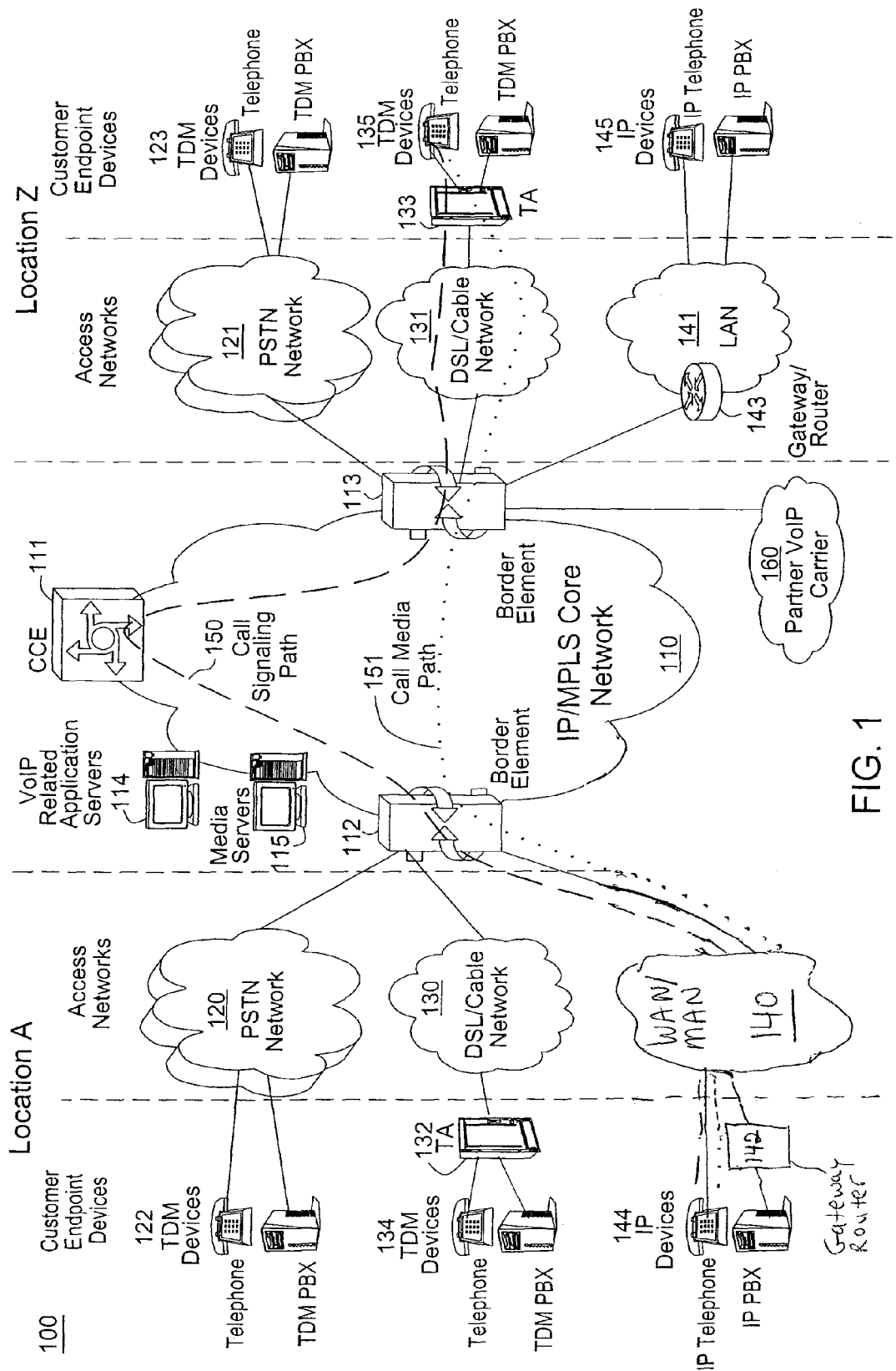
FIG. 1 illustrates an exemplary network related to the present invention.

To better understand the present invention, FIG. 1 illustrates an example network, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a Service over Internet Protocol (SoIP) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as data packets over an IP network. The present invention is described below in the context of an illustrative VoIP network. Thus, the present invention should not be interpreted as limited by this particular illustrative architecture.

The customer endpoint devices can be Time Division Multiplexing (TDM) based, IP based, or wireless such as cellular phones. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary inter-working functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices may access VoIP services by using a Local Area Network (LAN) 140 and 141 with a VoIP gateway or router 142 and 143, respectively without the TDM PBX 134

The access networks can be either TDM or packet based. A TDM PSTN 120 or 121 is used to support TDM customer endpoint devices connected via traditional phone lines. A packet based access network 130 or 131, such as DSL or Cable, when used together with a TA 132 or 133, is used to support TDM based customer endpoint devices. A packet based access network, such as Frame Relay, ATM, Ethernet or IP, is used to support IP based customer endpoint devices via a Wide Area Network (WAN) or a Metropolitan Area Network (MAN) 140 with a VoIP gateway router 142 located at customer premise.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a soft-switch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through VoIP Gateway/Router 142 to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoint devices the CCE 111 does not need to be in the data path for actual direct data exchange.

Media Servers (MS) 115 are special servers that typically handle and terminate media streams, and to provide services such as announcements, bridges, trans-coding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which the packets may traverse throughout the entire network. It is advantageous to support voice and data needs of a customer via IP services, e.g., VoIP services or SoIP services, on the Internet infrastructure. However, the VoIP or SoIP network may experience impairments that may affect the IP services provided to the customers. When an impairment is detected by a network service provider and/or is reported by a customer, the network service provider troubleshoots the impairment and performs the necessary remedies. For example, a work center for a network service provider may poll each device involved in handling a call for the customer and gather the associated call detail or performance records. In one embodiment, the cause of the impairment can be determined by analyzing the gathered call detail or performance records.

However, in a large service provider network, the work center staff have the responsibility to detect and fix the service problems within a specific time window for premium managed services before the customers call the help desk to report service troubles. It is critically important to automate the trouble detection process as much as possible and bring them immediately to the attention of the work center staffs for resolution. Handling each reported impairment has an associated time and cost, which may be very significant depending on the type of impairment. In addition, while the network service provider is troubleshooting the reported impairment, a customer may continue to experience degraded services (or even no service). Therefore, there is a need for a method that provides monitoring of packet networks in near-real-time, thereby minimizing the time that will be needed to troubleshoot a reported impairment. Resolving a reported impairment or even promptly informing a customer of the underlying cause of the reported impairment will increase customer satisfaction.

The current invention provides a method and apparatus for enabling a service provider to monitor VoIP/SoIP services on packet networks using call detail records (CDRs) in near-real-time. A CDR refers to a record in which call data for an individual call is recorded. The CDR may include details of each call such as the calling party, the called party, the source and destination IP addresses of the routers or border elements handling the call, the start time of the call, the duration of the call, the quality of service, disposition of the call including whether or not the called party was busy, whether or not the phone was ringing with no answer, and the like.

For example, if a customer accesses a VoIP service, a CDR may be created for each VoIP leg of the call by each voice gateway router. The CDR can be used for performing various functions, e.g., for accounting processes that partition charges among multiple carriers that may have transported the voice packets of a call, for billing processes that create bills requiring payment for services, for issuing rebates, and so on.

When a call is transmitted on a packet network, there may be many voice gateways that are used to handle the call. Calls originated at one voice gateway may terminate on any other voice gateway. When a call is completed, call detail records are generated at the ingress and egress voice gateways for each call leg. The call detail records are maintained in the voice gateways for each call leg. The voice gateways for one or more call legs may be polled by a network management system or network service provider personnel in order to gather the call detail records. Unfortunately, this approach creates a long delay and requires manual effort for troubleshooting, reporting and/or analysis in real-time or near-real-time by a network management system or work center personnel.

In one embodiment, the current invention provides near real-time call detail records to a network service provider. The customers' voice gateway routers proactively send CDRs to the network service provider in real-time by utilizing one or more servers dedicated for the collection and processing of CDRs. For example, the network service provider enables each customer voice gateway router to proactively send call detail records to a particular server in the service provider's network at the completion of each call. This approach enables the server to capture the CDR data for real-time analysis by the service provider. In one embodiment, the CDR data for the two endpoints of a call (source and destination addresses) are matched by the server that performs analysis based on CDRs. For example, certain attributes that are collected from each CDR may be compared against defined threshold values. For example, packet loss and latency may be compared to threshold values. If a threshold for a performance parameter (e.g., a packet loss parameter, a latency parameter, a hairpin parameter, a bad call disconnect parameter, a bad call length parameter, a call quality parameter, a one way audio parameter, a soft Digital Signal Processor (DSP) failure parameter, an excessive post dial delay parameter, a simultaneous disconnect per originating gateway router parameter, a simultaneous disconnect per destination gateway router parameter, a short call length to dial peer parameter, and an excessive hairpin detection per call parameter) is exceeded, an alarm and/or a ticket may be created.

Figure 2:
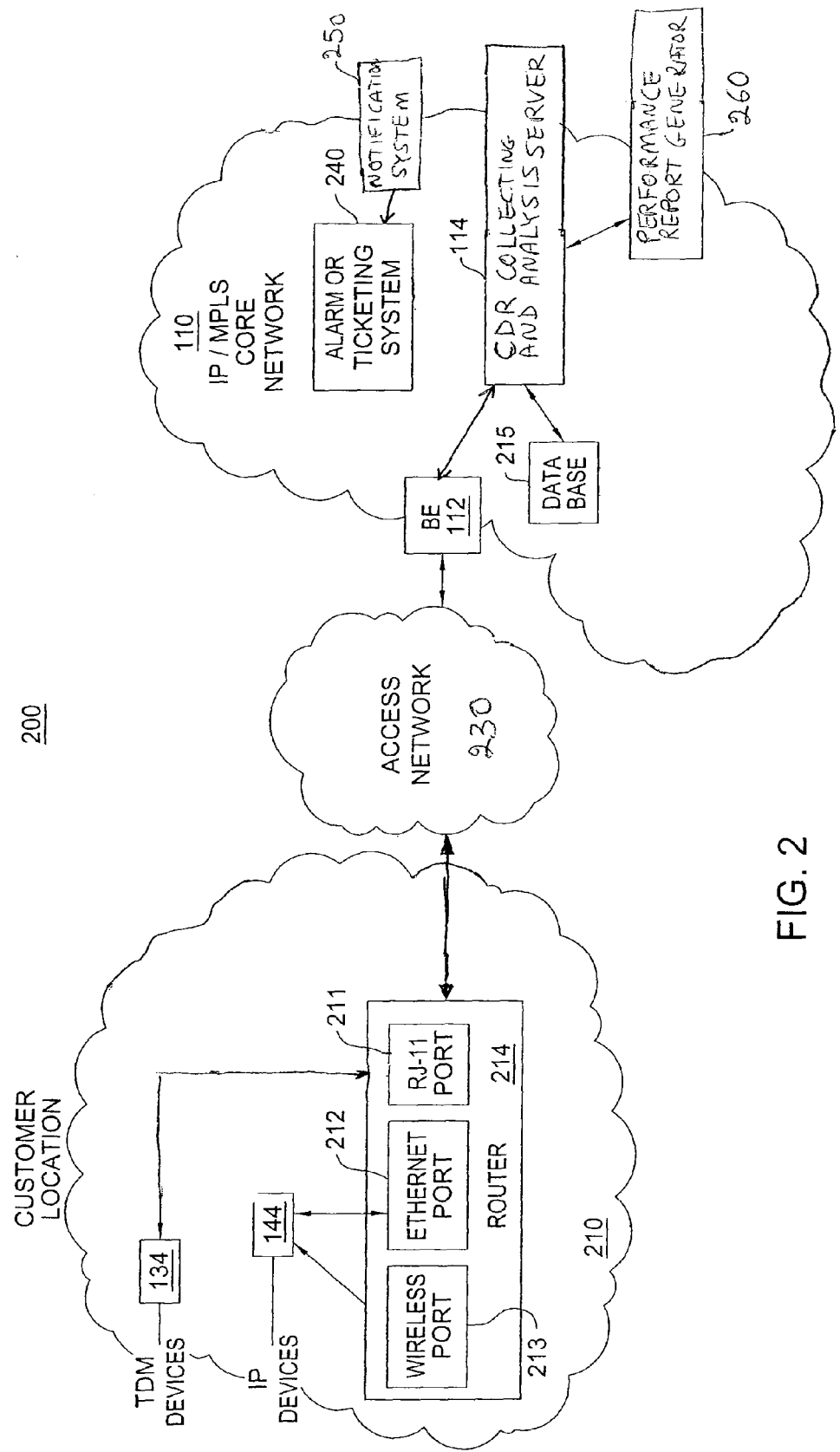
FIG. 2 illustrates an exemplary network with near-real-time monitoring using CDRs.

FIG. 2 illustrates an exemplary network 200 where the network is being monitored using CDRs, e.g., in near-real-time. For example, a customer location 210 is connected to the IP/MPLS core network 110 via an ATM, FR, PL, Ethernet, DSL, Cable, and etc, access network, e.g., an access network 230. Thus, a customer may use TDM endpoint devices 134 and IP endpoint devices 144 to receive and send voice and data packets.

A router 214 can be deployed to manage the sharing of the connection and may also include functions such as a firewall. The router 214 is connected to the access network 230 via ATM, FR, PL, Ethernet, DSL, cable, and etc. In one embodiment, the router 214 may contain one or more communication ports, e.g., a port for Ethernet connection 212, a port for RJ-11 connection 211, and a port for wireless connection 213. The RJ-11 ports are used for accessing the network with analog (TDM) devices 134 through a TA 132. In the current invention, the TDM endpoint device 134 may be connected to a Digital Signal Processing (DSP) card of router 214 without the use of the TA 132. The IP devices 144 may use either the Ethernet ports 212 or wireless ports 213.

In one embodiment, the current invention implements a method for enabling the network service provider to monitor a VoIP/SoIP service in near-real-time via a CDR collecting and analysis server 114. The customer's gateway router, e.g., router 214, generates a CDR at the end of each call and forwards the CDR to a CDR collecting and analysis server 114. In one embodiment, the CDR collecting and analysis servers 114 is dedicated for collecting and analyzing CDRs. The service provider gathers call detail records from a customer's voice gateway router in near real-time by utilizing said CDR collecting and analysis server 114. It should be noted that the term "near-real-time" refers to the fact that the CDRs are only collected at the end of each call and not while the call is still in progress. However, once the call has ended, the resulting CDR is generated and immediately sent by the voice gateway router to one of the CDR collecting and analysis servers. The CDRs are not stored locally at the voice gateway router for a long period of time.

In operation, the network service provider enables each customer router, e.g., router 214, to proactively send call detail records to a CDR collecting and analysis server 114 at the completion of each call. For example, a CDR collecting and analysis server may be assigned to serve a particular list of customer routers based on physical proximity to the customer routers. That means, the network service provider may deploy multiple CDR collecting and analysis servers in the network and assign a particular list of customer routers to each CDR collecting and analysis server. However, physical proximity may only be one parameter among many parameters that are used in the assignment of a particular server to a customer router.

In the present invention, the CDR collecting and analysis server 114 is capable of capturing the CDR data from customer routers and supporting real-time analysis. In one embodiment, the captured CDR data from the CDR collecting and analysis server 114 is provided to one or more databases 215.

In one embodiment, the CDR data for the two endpoints of each call (e.g., based on the source and destination IP addresses) are then matched by application server 114. It is necessary to match the CDR data for each call because the CDR data are provided by at least two voice gateway routers. Thus, it is necessary to match all the CDR data that are associated to a particular call.

In one embodiment, certain attributes that are collected from each CDR (or set of CDRs for a call) may then be compared against predefined threshold values stored in database 215. For example, packet loss and latency may be compared to predefined threshold values. For example, if a threshold for a particular performance parameter, e.g., packet loss, latency, etc., is exceeded, an alarm and/or a ticket may be created via alarm/ticketing systems 240 and notification system 250. The performance data (e.g., derived from the CDRs) may also be provided to a performance report generating system 260. For example, the performance data may be provided to a customer care work center and/or directly to the customer, in accordance with a service agreement between the service provider and the customer.

In one embodiment, the service provider of the core network 110 may use the call detail records that have been collected in near real time for detecting impairments in the network. For example, when a call is rejected within a network, a signal is sent back to the customer voice gateway router. However, the customer router may retry the call to a different peer address in a process called "hairpinning". However, if too many hairpins are occurring in the network, it may be an indication of a potential impairment, e.g., incorrect configurations. It should be noted that the number of hairpins are readily observable by analyzing the CDRs gathered from voice gateway routers. As such, application server 114 can be tasked to analyze CDRs that are collected in near-real-time to detect an unusually high number of hairpins for a particular time interval.

In another example, there may be a decrease in the quality of the calls, e.g., due to a large number of lost packets or long latency." In another example, there may be an increase in abnormal call disconnects, such as "no circuit available" which is generally referred to as "bad call disconnects." In another example, there may be an increase in abnormal call length, e.g., calls that are less than 5 seconds long, generally referred to as "bad call length." In another example, there may be one-way audio connection. In another example, there may be failure of digital signal processing card causing a call to "hang." In another example, there may be unacceptable level of post dial delay. In another example, there may be unacceptable number of simultaneous disconnects per originating gateway router. In another example, there may be unacceptable number of simultaneous disconnects per destination gateway router. In another example, there may be an unacceptable number of calls with short call length to dial peer. In another example, there may be excess hairpin detection per call. These observable conditions may indicate a configuration impairment for a network component, an impaired core router, an impaired switch, an impaired voice gateway, and the like. Again, these conditions are readily observable by analyzing the CDRs gathered from the customer voice gateway routers as described below.

In one embodiment, the service provider may predefine one or more thresholds for each one of these observable conditions. Thus, if one of these thresholds is exceeded, application server 114 may immediately generate an alarm and/or ticket.

In one embodiment, the performance parameter pertaining to hairpinning refers to trunking of voice gateways to route a call back to a Public Switched Telephone Network (PSTN) or a Private Branch eXchange (PBX) network if the VoIP network that normally transports the call is too busy to handle the call. Excessive hairpinning may refer to hairpinning more than a predefined threshold on a given gateway router within a predefined timeframe. For example, if three VoIP calls are handled by hairpinning to route over a PSTN network, then the VoIP network connection can be deemed to have excessive hairpinning. In one embodiment, the number of excessive hairpinnings for a network may be monitored via the collected CDRs and a threshold may be established. For example, a VoIP service provider may take corrective action when hairpinning calls exceed 3 calls within a 5 second interval on a given gateway router, and so on. An impairment of excessive hairpinning is then detected when the established threshold is exceeded.

In one embodiment, the performance parameter pertaining to call quality refers to the voice quality of a call as it might be perceived by a user based on objective measures. For example, latency, the number of dropped packets, perceived jitter, etc. may be measured and linked to a mean opinion score. For example, a latency of 150 ms may be linked to a specific mean opinion score or rating factor (R-factor). A call quality threshold may then be established, e.g., a call with R-factor below 0.65 is considered a poor quality call. If the number of calls with poor call quality for a voice gateway exceeds an established threshold within a predetermined timeframe, an impairment for call quality is detected.

In one embodiment, the performance parameter pertaining to bad call disconnect refers to a call disconnected for reasons other than in accordance with a normal call procedure. For example, a call may be disconnected while neither the calling party nor the called party terminated the call. The number of bad-call disconnects for a network may be monitored to establish a threshold. The number of bad call disconnects may then be compared to the threshold. For example, 10 bad call disconnects in 10 minutes at a voice gateway may indicate a network problem.

In one embodiment, the performance parameter pertaining to bad call length refers to calls that have a call length of less than a specific number of seconds, e.g. 5 seconds. A threshold may be established for the number of calls with bad-call-length. An alarm or a ticket may then be generated when the number of calls with bad call length for a timeframe exceeds a predetermined threshold.

In one embodiment, the performance parameter pertaining to one-way audio refers to an impairment that occurs when a caller initiates a call and the call is set-up, but the audio connection is only in one direction. Typically, either the calling party or the called party will hang up the call, thereby generating a short-duration call. In one embodiment, if the number of output packets at one end of a call is significantly different from the number of input packets at the other end of the call and the call also had a short-duration, then a one-way audio impairment is detected.

In one embodiment, the performance parameter pertaining to soft digital signal processing failure refers to a failure that occurs when one or more channels on a Digital Signal Processing (DSP) card in a voice gateway router "hang." When a soft DSP failure occurs, the call set-up cannot be completed and the customer premise time division multiplexed (TDM) private branch switch (PBX) generates a call detail record.

In one embodiment, the performance parameter pertaining to excessive post dial delay refers to a delay to setup a call exceeding a predetermined threshold. For example, if there is a router failure, calls may be routed using longer paths. A threshold may be established for the number of calls taking greater than z seconds in a particular timeframe. An alarm or a ticket may then be generated when the threshold is exceeded.

In one embodiment, the performance parameter pertaining to simultaneous disconnect per originating gateway router refers to identifying if X calls in Y minutes from a given originating router are disconnected, and then creating an alarm and/or a ticket. The parameters X and Y are configurable on a per-gateway router or network wide basis.

In one embodiment, the performance parameter pertaining to simultaneous disconnect per destination gateway router refers to identifying if X calls in Y minutes to a given destination router are disconnected and then creating an alarm and/or a ticket. The parameters X and Y are configurable on a per-gateway router or network wide basis.

In one embodiment, the performance parameter pertaining to short call length to dial peer refers to identifying if X calls home-in on a dial peer in Y minutes having duration of less than Z seconds, and then creating a ticket. Only calls using dial peers in a specified list are examined for this alarm. For example, dial-peer may equal peer ID in the call record. On a router, the dial peers are a list of call routing rules that categorize the calls by destination. The parameters X, Y, and Z are configurable parameters on a per-gateway router basis.

In one embodiment, the performance parameter pertaining to excessive hairpin detection per call refers to identification of a call routed to one or more peers. If a single call has multiple entries in a log file with different setup times and network access server ports then it is being hair-pinned. If the occurrence is more then X times then the call had excessive hairpin. An alarm may be sent if the gateway router has one or more excessive hairpin calls during the day by performing end of day CDR analysis. The parameter X is configurable and may be defined on a per-gateway router basis or network wide. In one embodiment, only one alarm is generated per gateway router if one or more calls are identified with excessive hairpins.

Figure 3:
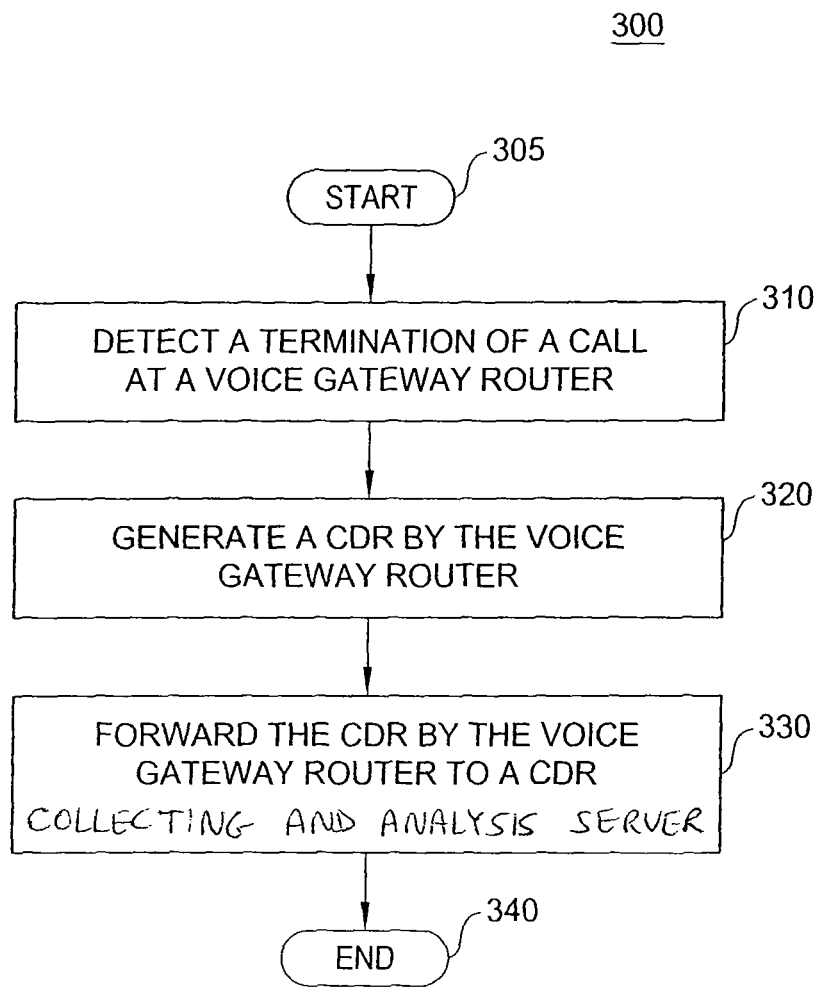
FIG. 3 illustrates a flowchart of a method for collecting CDRs in near real time.

FIG. 3 illustrates a flowchart of a method 300 for collecting CDRs in near real time. For example, a service provider enables each customer voice gateway router (e.g., an ingress voice gateway router or an egress voice gateway router) to proactively send CDRs to a specific CDR collecting and analysis server 114 at the termination or completion of each call.

Method 300 starts in step 305 and proceeds to step 310. In step 310, method 300 detects termination of a call at a voice gateway router, e.g., an ingress or egress voice gateway router. For example, the voice gateway router detects that the caller has ended a call.

In step 320, method 300 generates a call detail record at the end of the call by each voice gateway router that serviced the call, e.g., by the ingress and egress voice gateway routers. For example, when the called and calling parties terminate the call, each of the voice gateway routers supporting the called and calling parties' endpoints will generate a call detail record. It should be noted that if more than two voice gateway routers have serviced the call, then more than two CDRs will be generated.

In step 330, method 300 forwards the call detail record generated by each voice gateway router to a CDR collecting and analysis server 114. For example, each voice gateway router sends the CDR to its assigned CDR collecting and analysis server 114 located in the service provider's network. Method 300 ends in step 340.

Figure 4:
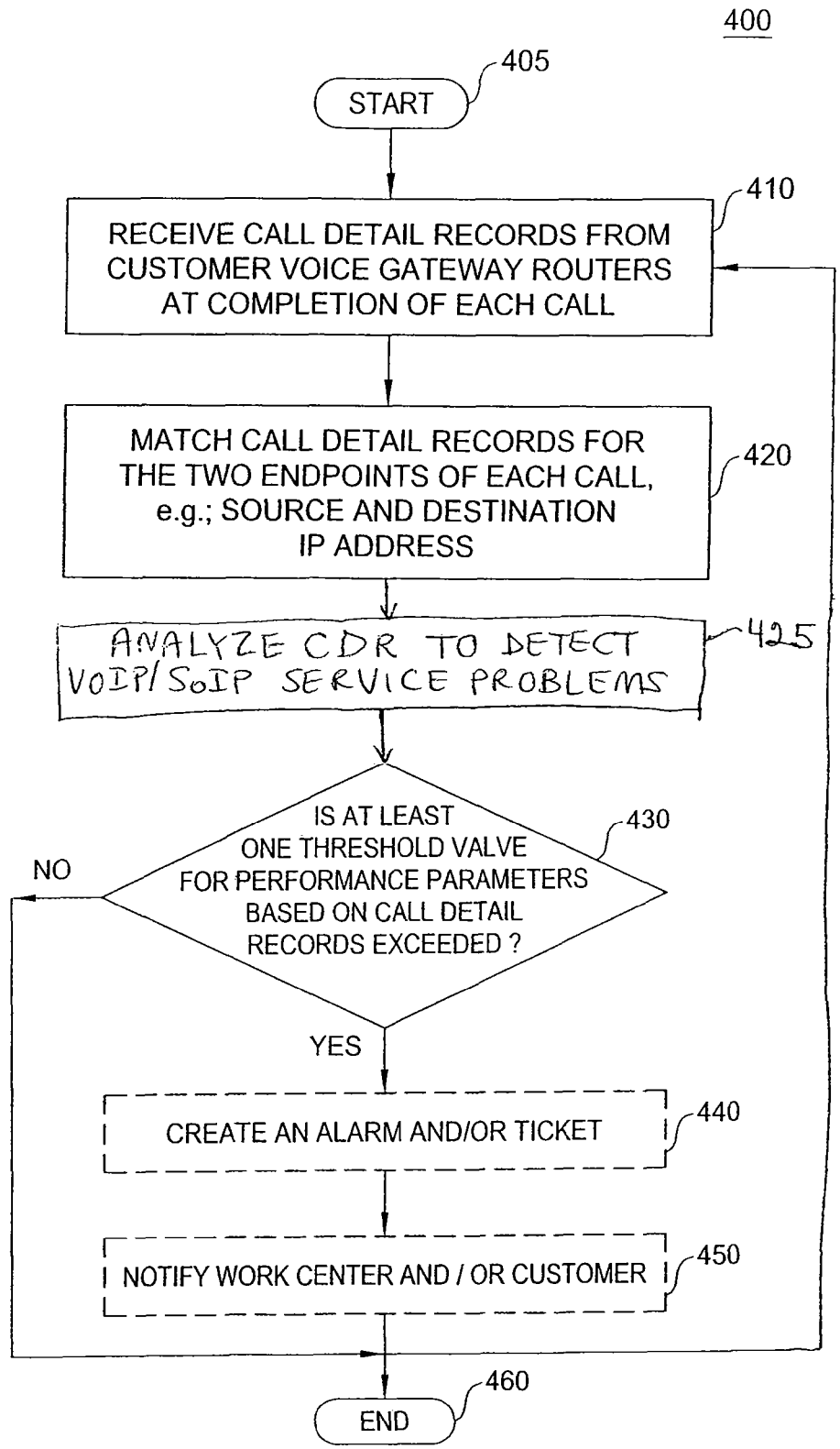
FIG. 4 illustrates a flowchart of a method for detecting impairments using CDRs.

FIG. 4 illustrates a flowchart of a method 400 for detecting a network impairment using CDRs that are collected in near-real-time. The service provider enables an application server to gather CDRs from CDR collecting and analysis servers and to analyze the collected CDR information and to match CDRs based on source and destination addresses for each call. The service provider also sets one or more thresholds for detecting impairments based on quality measures, for alarm/ticket creation, and for notification to customer care work centers/customers.

Method 400 starts in step 405 and proceeds to step 410. In step 410, method 400 receives call detail records from customer voice gateway routers at the completion of each call. For example, dedicated CDR collecting and analysis server 114 may be used to capture and process CDR data received from routers located at customer sites.

In step 420, method 400 matches CDR data for the two endpoints of each call. For example, an application server matches the CDRs for a call based on the source and destination IP addresses. Some alarms depend on either an ingress or an egress alarm, while other alarms require matching ingress and egress alarms. For example, for one way audio, the matching of ingress and egress CDRs may be used to generate one-way audio alarm. The method then proceeds to step 425.

In step 425, method 400 analyzes CDRs to detect VoIP/SoIP problems. The detection may be based on ingress and egress alarms. The method then proceeds to step 430.

In step 430, method 400 determines whether or not at least one threshold value for detecting one or more impairments for at least one performance parameter (e.g., a packet loss parameter, a latency parameter, a hairpin parameter, a bad call disconnect parameter, a bad call length parameter, a call quality parameter, a one way audio parameter, a soft Digital Signal Processor (DSP) failure parameter, an excessive post dial delay parameter, a simultaneous disconnect per originating gateway router parameter, a simultaneous disconnect per destination gateway router parameter, a short call length to dial peer parameter, and an excessive hairpin detection per call parameter) based on the collected CDRs is exceeded. In other words, method 400 is monitoring at least one of said performance parameter by using the collected CDRs. For example, data associated with packet loss and latency derived from the CDRs may be compared to predefined threshold values. If a threshold for at least one performance parameter is exceeded, the method proceeds to step 440. Otherwise, the method proceeds to step 460.

In an optional step 440, method 400 creates an alarm and/or a ticket. For example, an analysis of the CDRs in near-real-time may reveal that a VoIP gateway router located at a customer site may be associated with multiple dropped calls. In response, an alarm or a ticket may be created so that pertinent remedial actions can be initiated. The method then proceeds to step 450.

In an optional step 450, method 400 may notify a customer care work center and/or the customer directly. For example, a customer may have entered into a service agreement with a network service provider to receive notices of any known impairments. In another example, the customer's contract may dictate that the network service provider needs to detect service impairment problems within a specific time window after they occur. In another example, a rebate based on the quality of service may have been established. In another example, a customer may have subscribed to a backup service with another service provider in the event of experiencing significant impairments on its primary service. The method then ends in step 460 or returns to step 410 to continue receiving CDRs.

Figure 5:
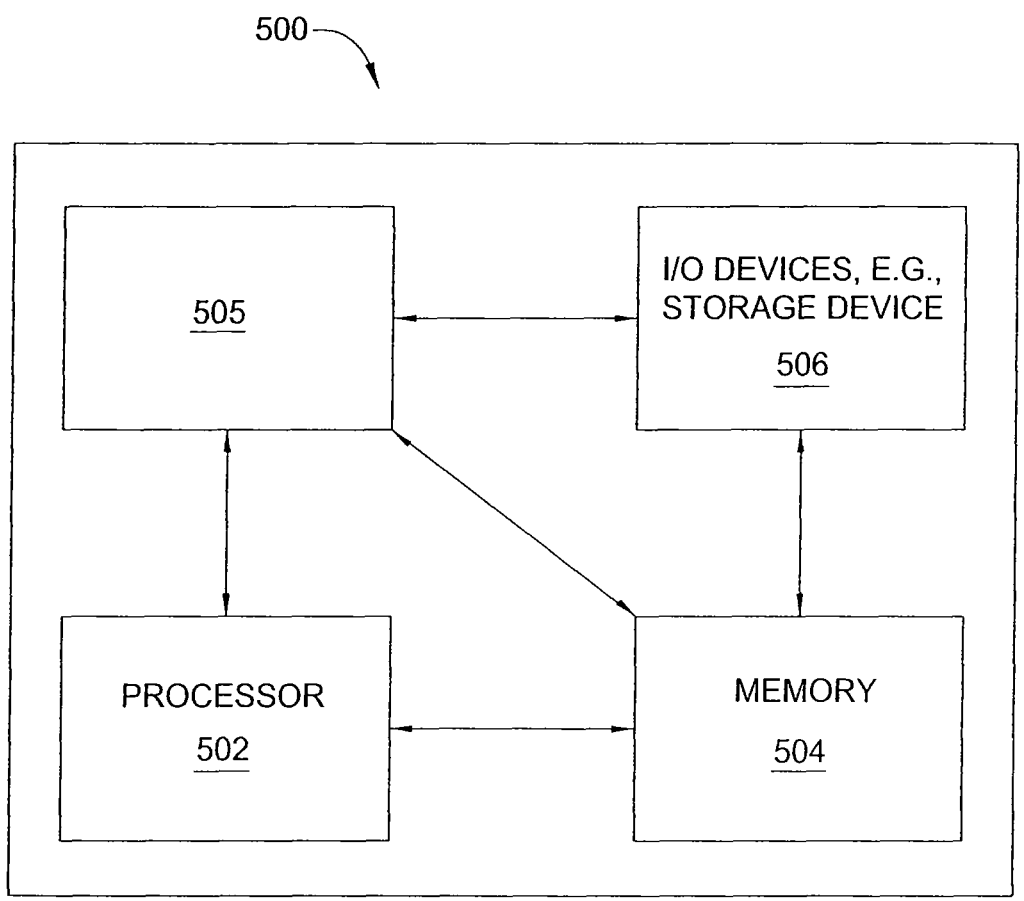
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for monitoring a packet network in near-real-time, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for monitoring, a packet network in near-real-time can be loaded into memory 504 and executed by processor 502 to implement the functions as discussed above. As such, the present method 505 for monitoring a packet network in near-real-time (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring a packet network, comprising:
receiving, by a processor, a plurality of call detail records at a completion of a call from a plurality of voice gateway routers that serviced the call over the packet network;
matching, by the processor, a first call detail record of the plurality of call detail records with a second call detail record of the plurality of call detail records that were generated from the call based upon a source address and a destination address;
analyzing, by the processor, the first call detail record and the second call detail record that are matched; and
monitoring, by the processor, a call performance parameter in accordance with the first call detail record and the second call detail record that are matched, wherein the call performance parameter comprises a hairpin parameter, wherein the monitoring the call performance parameter comprises determining whether the call performance parameter has exceeded a threshold value in a predetermined timeframe.

2. The method of claim 1, wherein the call performance parameter is one of a plurality of call performance parameters that is monitored, wherein another one of the plurality of call performance parameters comprises a packet loss parameter.

3. The method of claim 1, further comprising:
generating an alarm if the threshold value is exceeded.

4. The method of claim 1, further comprising:
generating a ticket if the threshold value is exceeded.

5. The method of claim 1, further comprising:
notifying a customer care work center if the threshold value is exceeded.

6. The method of claim 1, further comprising:
notifying a customer directly if the threshold value is exceeded.

7. The method of claim 1, wherein the plurality of call detail records is provided to a call detail record collecting and analysis server.

8. The method of claim 1, wherein each of the plurality of voice gateway routers is located at a customer location.

9. A non-transitory computer-readable medium storing a plurality of instructions, which, when executed by a processor, cause the processor to perform operations for monitoring a packet network, the operations comprising:
receiving a plurality of call detail records at a completion of a call from a plurality of voice gateway routers that serviced the call over the packet network;
matching a first call detail record of the plurality of call detail records with a second call detail record of the plurality of call detail records that were generated from the call based upon a source address and a destination address;
analyzing the first call detail record and the second call detail record that are matched; and
monitoring a call performance parameter in accordance with the first call detail record and the second call detail record that are matched, wherein the call performance parameter comprises a hairpin parameter, wherein the monitoring the call performance parameter comprises determining whether the call performance parameter has exceeded a threshold value in a predetermined timeframe.

10. The non-transitory computer-readable medium of claim 9, wherein the call performance parameter is one of a plurality of call performance parameters that is monitored, wherein another one of the plurality of call performance parameters comprises a packet loss parameter.

11. The non-transitory computer-readable medium of claim 9, further comprising:
generating an alarm if the threshold value is exceeded.

12. The non-transitory computer-readable medium of claim 9, further comprising:
generating a ticket if the threshold value is exceeded.

13. The non-transitory computer-readable medium of claim 9, further comprising:
notifying a customer care work center if the threshold value is exceeded.

14. The non-transitory computer-readable medium of claim 9, further comprising:
notifying a customer directly if the threshold value is exceeded.

15. The non-transitory computer-readable medium of claim 9, wherein the plurality of call detail records is provided to a call detail record collecting and analysis server.

16. The non-transitory computer-readable medium of claim 9, wherein each of the plurality of voice gateway routers is located at a customer location.

17. An apparatus for monitoring a packet network, comprising:
a call detail record collecting and analysis server for receiving a plurality of call detail records at a completion of a call from a plurality of voice gateway routers that serviced the call over the packet network, for matching a first call detail record of the plurality of call detail records with a second call detail record of the plurality of call detail records that were generated from the call based upon a source address and a destination address, for analyzing the first call detail record and the second call detail record that are matched, and for monitoring a call performance parameter in accordance with the first call detail record and the second call detail record that are matched, wherein the call performance parameter comprises a hairpin parameter, wherein the monitoring the call performance parameter comprises determining whether the call performance parameter has exceeded a threshold value in a predetermined timeframe.

* * * * *